Figure 1:
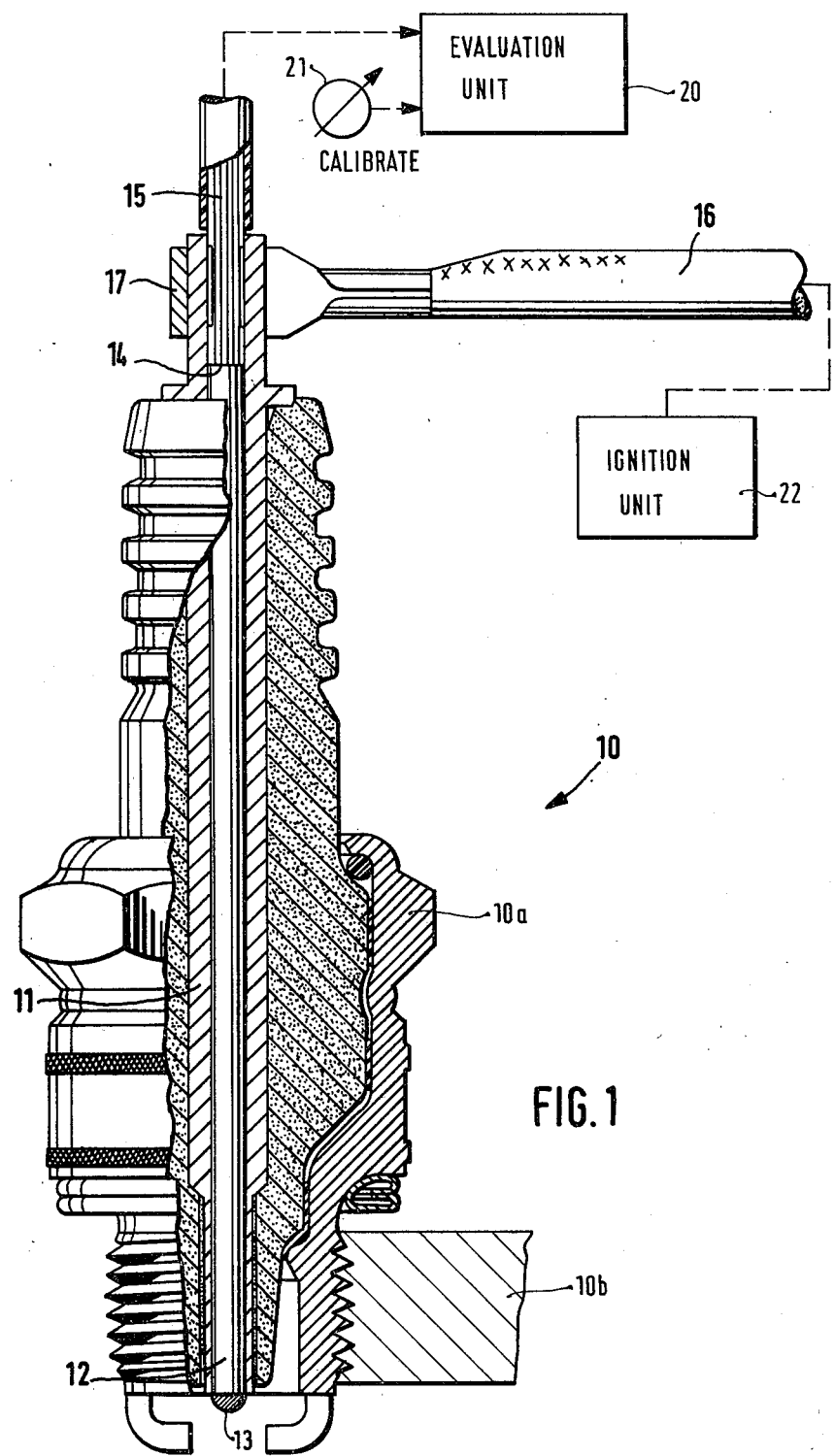

United States Patent [19]

Böning et al.

[11] 4,446,723

[45] May 8, 1984

[54] OPTICAL COMBUSTION EVENT SENSOR STRUCTURE PARTICULARLY KNOCK SENSOR FOR AN INTERNAL COMBUSTION ENGINE

[75] Inventors: Bernward Böning, Ludwigsburg; Rainer Bone, Vaihingen; Rudolf Nagel, Asperg; Franz Sellmaier, Schwieberdingen; Helmut Reum, Stuttgart, all of Fed. Rep. of Germany

[73] Assignee: Robert Bosch GmbH, Stuttgart, Fed. Rep. of Germany

[21] Appl. No.: 344,409

[22] Filed: Feb. 1, 1982

[30] Foreign Application Priority Data

Mar. 20, 1981 [DE] Fed. Rep. of Germany ....... 3110997

[51] Int. Cl.³ ............................................. G01L 23/22
[52] U.S. Cl. ......................................... 73/35; 356/44; 374/144
[58] Field of Search ..................... 73/35; 123/425, 435; 374/144, 131, 161, 130; 313/129; 356/44

[56] References Cited

U.S. PATENT DOCUMENTS

| | | | |
|---|---|---|---|
| 1,560,510 | 11/1925 | Hirsch | 313/129 |
| 4,092,863 | 6/1978 | Turner | 374/169 |
| 4,265,206 | 5/1981 | Garcea | 73/35 |

FOREIGN PATENT DOCUMENTS

| | | | |
|---|---|---|---|
| 54-58109 | 5/1979 | Japan | 374/144 |
| 263883 | 8/1927 | United Kingdom | 313/129 |
| 823164 | 11/1959 | United Kingdom | 356/44 |

OTHER PUBLICATIONS

"Fiber Optic Probe . . . "by Holmes from Review of Scientific Instruments, May 1979, pp. 662–663.

Primary Examiner—James J. Gill
Attorney, Agent, or Firm—Frishauf, Holtz, Goodman & Woodward

[57] ABSTRACT

A light guide element, secured in a spark plug-like housing and positioned, for example, within a metallic tube forming a spark plug connector, is coated at the end facing the combustion chamber with a light-impervious material viz: graphite, the graphite emitting radiation upon influence of heat arising within the combustion chamber, which radiation is transmitted to the optical pick-up for subsequent photo-electric evaluation thereof. The optical pick-up is, for example, a quartz glass rod coupled to a light guide cable, or directly coupled to an opto-electrical transducer.

10 Claims, 2 Drawing Figures

OPTICAL COMBUSTION EVENT SENSOR STRUCTURE PARTICULARLY KNOCK SENSOR FOR AN INTERNAL COMBUSTION ENGINE

Reference to related application, assigned to the assignee of this invention, the disclosure of which is hereby incorporated by reference: U.S. Ser. No. 06/214,481, filed Dec. 9, 1980, MULLER, LINDER and MAURER now U.S. Pat. No. 4,393,687 issued July 19, 1983.

The present invention relates to a sensor structure to obtain output signals representative of combustion events, and more particularly to a sensor structure which is particularly suitable for introduction through the cylinder wall or cylinder block of an internal combustion (IC) engine.

The present invention also relates to a combustion process observation element, and more particularly to the constructional features of such an element to permit its association with a housing structure, for example the cylinder block of an internal combustion engine, to permit observation of the combustion occuring during operation of the engine. The element is particularly suitable to detect unusual combustion conditions, for example upon knocking of the engine, or incipient knocking.

BACKGROUND

It is frequently, desirable to monitor combustion processes occurring in internal combustion engines, which may be of the Otto type or of the Diesel type, and which use light sensitive elements, which may be supplied with light through a light guide to permit viewing of the actual combustion processes which occur upon ignition of an air-fuel mixture within the combustion chamber of the engine. Preferably, the combustion process should be monitored with respect to time, so that it can be monitored during actual operation of the engine, as the piston reciprocates within the cylinder. Observation may, for example, extend to the temporal and geometric distribution of the flame occuring during combustion; sensing of the ignition instant, sensing of fuel injection or fuel supply process; and, especially, sensing of undesirable or irregular combustion processes.

Irregular combustion may lead to knocking of the engine, such knocking occurs under certain operating conditions. Knocking, as usually understood, is caused by oscillations within the audible frequency band of the compressed fuel-air mixture which is triggered by a shock wave. The heat transmission to the piston walls and the cylinder walls of the engine is substantially increased during such oscillations. A thermal overload of the surfaces will result, so that knocking should be avoided. For most efficient operation of the engine, however, it is desirable to utilize the working range of the engine to the greatest possible extent and, therefore, the engine should be operated just below the "knocking limit". It is necessary then to have some means which clearly and reliably indicate knocking, or a tendency to knock, so that the operating parameters of the internal combustion (IC) engine can then be so controlled that the engine will operate just below the knocking limit.

Various types of sensors to determine knocking have been proposed. Mechanical systems which sense the transferred oscillations to the engine, for example using a piezoelectric sensor, are easily made but have the disadvantage that such systems are difficult to operate reliably and free from interference and stray signals, since they also may respond to externally generated jolts and oscillations which arise in the operation of a vehicle to which the engine may be coupled, for example over bad roads or corrugated roads.

It has also been proposed to sense and observe the combustion process by optical means. An optical sensor and background literature are described in the cross-referenced application, assigned to the assignee of the present application, Ser. No. 06/214,481, filed Dec. 9, 1980, MULLER et al now U.S. Pat. No. 4,393,687 issued July 19, 1982. This application discloses a sensor which includes light guide fibers or filaments which are positioned to sense the combustion event optically, the light guides being connected to a photoelectric transducer which, in turn, provides output signals to a tuned or filter circuit which is responsive to or tuned to expected knocking frequency to provide an output signal if shock waves occurring within the combustion chamber are of a frequency which results in engine knocking. Of course, the signals derived from the photoelectric transducer can be processed in any desired manner. The aforementioned patent application further describes integration of the light guide with a spark plug of an internal combustion engine; or to place light guides in the cylinder head gasket or seal, for eventual connection to photoelectric transducers.

Sensing physical parameters occurring with the combustion chamber of an IC engine by optical means causes problems: The optical element which faces the combustion chamber, for example a glass rod, a fiber cable, or the like, will become dirty or blackened during operation, particularly upon extended operation, so that effective output and suitable measuring and evaluation of the light output becomes difficult, and in a limiting case even impossible after some operating time. Various proposals have been made to keep the side of the light guide facing the combustion chamber clean, or to so position and shape that portion of the light guide that it will be subjected to flushing action by induced fuel, swirling air-fuel gases, and the like, to thereby maintain the optical transmissivity thereof.

Various types of sensors to determine temperature within the combustion chamber of an IC engine have been proposed, see for example German Patent Disclosure Document DE-OS No. 30 06 603 to which U.S. Ser. No. 237,106, filed Feb. 23, 1981, now U.S. Pat. No. 4,397,176, Rohde, assigned to the assignee of this application, corresponds.

THE INVENTION

It is an object to carry out temperature measurements within a combustion space of a combustion chamber and obtain an optical output which can be converted to an electrical signal.

Briefly, an optical pick-up which includes a light-sensitive element such as a light guide, is introduced into the combustion chamber. The light guide can be directly coupled to an opto-electrical transducer, such as a light-sensitive or light-sensitive transistor, or can be in form of a light guide cable for remote sensing of the light output. The light guide, in accordance with the invention, has a layer of light-impervious or opaque material applied thereto at the end facing the combustion chamber. The opaque or light-impervious material is temperature-sensitive, high-temperature-resistant, and uses a material which, under the influence of the combustion heat, emits light within the radiation reception range of the light guide and/or light-responsive element.

The material for the layer or coating is graphite, other materials such as copper, silver, or gold are also operative. The light guide is, for example, in the form of a central light guide rod made of quartz glass.

The sensor, when coupled to an evaluation system, has the advantage that temperature measurements can be carried out rapidly by using an optical pick-up. The region of the sensor which is exposed to the combustion chamber and, when coated, with a layer of graphite, which is a suitable and preferred material, is essentially impervious to contaminants or residues which may be contained within combustion gases in the combustion chamber.

Figure 2:
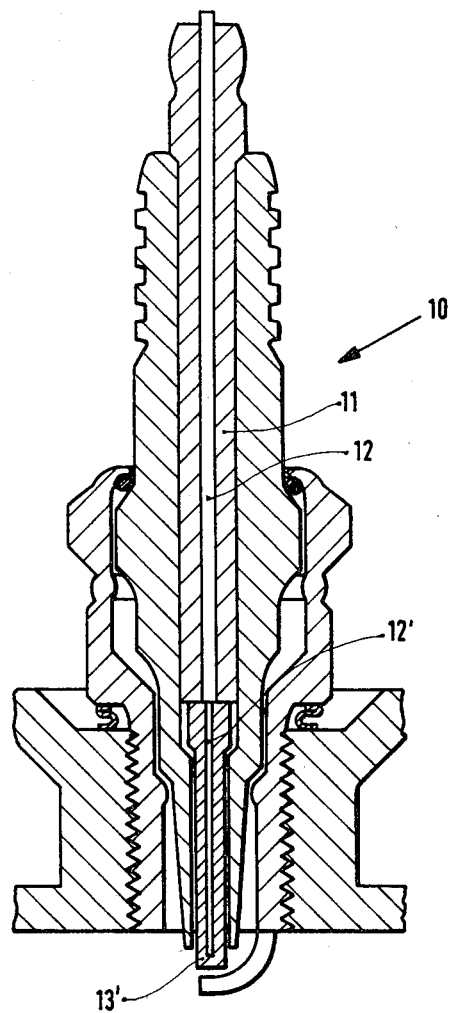

DRAWINGS:

FIG. 1 is a schematic cross-sectional view through a sensor retained within a housing similar to a spark plug housing, for combination of the sensor with an automotive-type spark plug unit; and FIG. 2 is a schematic vertical cross-sectional view through another embodiment of the sensor.

A spark plug housing 10a retains the sensor 10. The spark plug housing 10a has a metallic tube 11 inserted therein which forms the center electrode of the spark plug. The metallic tube 11 surrounds a light guide or light conductor 12 in form of a light guide rod, for example of quartz glass. The end of the light guide rod 12 facing the combustion chamber is coated with a layer 13 of a temperature-conductive, high temperature-resistant graphite. The light guide rod 12 is closed off at the end facing the combustion chamber so that it is light-impervious. The spark plug housing 10a is formed with a thread, as customary, and screwed into a suitable tapped opening in an end wall 10b defining, at the lower side with respect to FIG. 1, a combustion chamber.

The end of the light guide rod 12 remote from the combustion chamber is coupled optically to a light guide cable 15 which is connected to an optical evaluation unit 20, shown only schematically. The evaluation unit 20 may include, for example, opto-electrical transducers or the like, to provide output control signals to change ignition timing, air-fuel composition, inlet pressure, and the like, or other parameters relating to the operation of an IC engine. Rather than using a light guide cable 15, a photo-sensitive transducer can be directly applied to the end or transition surface 14 from rod 12 to obtain electrical output signals directly from the unit.

Ignition energy is supplied to the plug over an ignition cable 16 and a ring contact 17 from an ignition unit 22.

Operation: Combustion within the combustion chamber of the IC engine causes heating of the layer 13. The radiation characteristic with respect to temperature of the material being used, for example graphite, is defined and well known. The layer 13, thus, will radiate in the direction of the rod 12, the radiation being within the visible as well as invisible range. The radiation characteristic transmitted to the layer 13 will depend solely on the temperature of the layer 13. This is not changed even if, during the operation of the IC engine, layer 13 is contaminated by deposits which will form in the course of time in the combustion chamber, and which may interfere with direct optical transmission of light due to combustion to a light guide; the re-radiation characteristics of the layer 13 on the light guide cable 12 is not influenced by such contaminants or deposits. Excessive contamination or deposits on the layer 13 may lead to a change in the dynamic characteristics of the sensor, that is, response speed with respect to changes in temperature may decrease. The sensor signal, thus, will lag behind the actual temperature conditions within the combustion chamber. Compensation can readily be effected with respect to such lag or delay by introducing calibrating quantities from a calibration set control 21 to the evaluation unit 20. Compensation for such delays and lags are well known, and any suitable compensation system or mode may be employed.

Graphite is particularly suitable as material for the layer 13. Graphite has a sublimation temperature of about 3900° C. and, hence, is thermally highly resistant. Thermal damage of the layer 13 thus is unlikely.

The embodiment of FIG. 2 is basically similar to that of FIG. 1; the difference is that the element 13' of FIG. 2 is formed as a tubular portion surrounding a light guide unit 12', the portion 13' being in electrical contact with the metallic tube 11 and forming, at the same time, the center electrode for the spark plug. The tubular portion or layer 13' again is made of a temperature-resistant and heat-conductive graphite, it radiates, in accordance with its re-radiation characteristic, into the light guide 12' and hence transmits radiation to the light guide 12 for subsequent coupling of the output to an evaluation unit 20—not shown in FIG. 2.

When exposed to the temperature in an internal combustion engine, the coating or portion 13, 13' will be raised to a temperature, where radiation both in the infrared and visible range is transmitted to the light guide 12, 12', respectively, for subsequent evaluation. The wave length of this light radiation is in the order of 550 nm to 10 micrometers, so that, preferably, the infrared components of the radiation are used for the evaluation. The light guide preferably comprises a quartz rod, whose cutoff frequency D is well below this infrared range. Quartz rods and respective light guide cables transmitting also infrared components are well known in the art and commercially available.

Various changes and modifications may be made, and features described in connection with any one of the embodiments may be used with any of the others, within the scope of the inventive concept.

We claim:

1. Knocking sensor structure to obtain a signal representative of temperature characteristics of combustion events within a combustion chamber of an internal combustion engine, (ICE),
   in combination with means (10b) for defining the combustion chamber of the internal combustion engine,
   the sensor structure having
   a spark plug structure including a tubular housing (10a) formed with means for securing the housing into a wall (10b) defining one side of the combustion chamber;
   a center electrode (11) insulatingly passing through the tubular housing;
   light sensitive means (15) retained in the housing;
   a light pick-up means (12) retained in the housing having a sensing portion at an end portion of the pick-up means, lcated within the combustion chamber, and being coupled to the light sensitive means at an other end of the pickup means said pickup means further comprising a layer of graphite, located at said sensing end and located within the combustion chamber which layer is heat resistant and, when subjected to the temperature of the combustion chamber during occurrence of combustion events therein, becomes light emitting;

emission of light being sensed by the sensing end portion of the pick-up means, and transmitted to the light sensitive means, the light emission being representative of the temperature to which said graphite layer is being raised as a consequence of combustion events.

2. Structure according to claim 1, wherein said central electrode includes a metal tube (11);

and the pick-up means includes a light guide rod (12) positioned centrally within the tube forming the central electrode of the spark plug structure, the graphite being applied to the light guide rod.

3. Structure according to claim 1, wherein said light pickup means comprises a rod of quartz glass.

4. Structure according to claim 1, wherein the pickup means comprises a light guide rod which includes a terminal portion (12') of light transmissive material;

and the layer of graphite (13') surrounds said terminal portion at all sides external of the light guide rod, and extending within the spark plug structure and forming part of the center electrode.

5. Structure according to claim 4, wherein said light guide rod (12) comprises a light guide element (12') and a light transmitting light guide structure.

6. Structure according to claim 1, further including an evaluation unit coupled to said light sensitive, means (15) for electro-optical evaluation of light, representative of combution chamber temperature, transmitted to said pick-up means.

7. Structure according to claim 1, further including calibration means (21) coupled to the evaluation unit for compensation of time constants of response of emission of light by said layer of graphite material under influence of high temperatures within the combustion chamber.

8. Knocking sensor and spark plug combination structure to obtain a signal representative of temperature characteristic of combustion events within a combustion chamber of an externally ignited internal combustion engine (ICE), in combination with means (10b) for defining the combustion chamber of the internal combustion engine, comprising a spark plug structure including a tubular housing (10a) formed with means for securing the housing defining one side of the combustion chamber;

a center electrode (11) insulating the passing through the tubular housing;

light sensitive means (15) retained in the housing;

and a combination center-electrode temperature responsive element comprising a light pick-up means (12) retained in the housing having a sensing end portion at an end of the spark plug structure, which end is positioned within the combustion chamber of the engine, said light pick-up means being coupled to the light sensitive means (15), said light pick-up means comprising a metal tube (11) electrically forming the center electrode of the spark plug surrounding said end portion of the pick-up means;

a layer of graphite (13) at the terminal end portion of the light pick-up means, said layer of graphite, under influence of the combustion temperature within the combustion chamber becoming light emitting at emission intensities representative of combustion temperature;

and an evaluation unit (20) coupled to said light sensitive means for optical-electrical evaluation of light transmitted by said light pick-up means and representative of combustion chamber temperature for temperature-evaluation of the temperature in the combustion chamber.

9. Knocking sensor and spark plug combination structure to obtain a signal representative of temperature characteristic of combustion events within a combustion chamber of an externally ignited internal combustion engine (ICE), in combination with means (10b) for defining the combustion chamber of the internal combustion engine, comprising a spark plug structure including a tubular housing (10a) formed with means for securing the housing defining one side of the combustion chamber;

a center electrode (11) insulating the passing through the tubular housing;

light sensitive means (15) retained in the housing;

and a combination center-electrode temperature responsive element comprising a light pick-up means (12) retained in the housing having a sensing end portion at an end of the spark plug structure, which end is positioned within the combustion chamber of the engine, said light pick-up means being coupled to the light sensitive means (15), said light pick-up means comprising a terminal portion (12') of light transmissive material, and a layer of graphite (13') surrounding said terminal portion of light transmissive material on all sides, and in electrical contact with said center electrode, and forming part of the center electrode, and an evaluation circuit coupled to said light sensitive means (15) for optical-electrical evaluation of light emitted by said layer of graphite representative of combustion chamber temperature.

10. Knocking sensor and spark plug combination structure according to claim 9 wherein said light guide rod, an light transmissive material comprises quartz glass.

* * * * *